US006486266B2

(12) United States Patent
Amano et al.

(10) Patent No.: US 6,486,266 B2
(45) Date of Patent: Nov. 26, 2002

(54) THERMOSETTING RESIN COMPOSITION

(75) Inventors: Satoshi Amano, Tokyo (JP); Hideshi Tomita, Tokyo (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 09/924,305

(22) Filed: Aug. 8, 2001

(65) Prior Publication Data

US 2002/0004562 A1 Jan. 10, 2002

Related U.S. Application Data

(62) Division of application No. 09/286,801, filed on Apr. 6, 1999, now Pat. No. 6,300,425.

(30) Foreign Application Priority Data

May 11, 1998 (JP) .............................. 10-127965

(51) Int. Cl.[7] ..................... C08L 79/00; C08G 1/832; C08G 18/78; C08G 18/79
(52) U.S. Cl. ........................ 525/452; 528/51; 528/68
(58) Field of Search ........................... 525/452; 528/51, 528/68

(56) References Cited

U.S. PATENT DOCUMENTS

| | | | | |
|---|---|---|---|---|
| 4,028,310 A | * | 6/1977 | Schafer et al. ............. 528/67 |
| 4,218,543 A | * | 8/1980 | Weber et al. ............... 521/51 |
| 4,607,090 A | * | 8/1986 | Dominguez ................ 528/48 |
| 4,732,919 A | * | 3/1988 | Grigsby, Jr. et al. ....... 521/159 |
| 4,806,615 A | * | 2/1989 | Rice et al. ................. 528/68 |
| 4,812,524 A | * | 3/1989 | Baghdachi ................ 525/194 |
| 5,079,326 A | * | 1/1992 | Suzuki et al. .............. 528/53 |
| 5,223,584 A | * | 6/1993 | Lenke et al. .............. 525/405 |
| 5,321,101 A | * | 6/1994 | Suzuki et al. ............. 525/452 |
| 5,576,398 A | * | 11/1996 | Takahashi et al. ......... 525/528 |
| 5,925,409 A | * | 7/1999 | Nava ....................... 427/238 |
| 5,929,188 A | * | 7/1999 | Nakamura et al. .......... 528/68 |
| 6,103,836 A | * | 8/2000 | Imashiro et al. .......... 525/452 |
| 6,211,293 B1 | * | 4/2001 | Nakamura et al. ......... 525/131 |
| 6,300,425 B1 | * | 10/2001 | Amano et al. ............. 525/452 |

* cited by examiner

Primary Examiner—Rabon Sergent
(74) Attorney, Agent, or Firm—Kilpatrick Stockton LLP

(57) ABSTRACT

A modified carbodiimide resin obtainable by reacting a carbodiimide resin comprising a repeating unit represented by the general formula: —(NCN—$R^1$)- wherein $R^1$ represents a divalent organic group, with an aromatic diamine represented by the general formula: $H_2N$—$R^2$—$NH_2$ wherein $R^2$ represents a divalent organic group having a benzene ring, and a thermosetting resin composition comprising the modified carbodiimide resin and an epoxy resin.

6 Claims, No Drawings

THERMOSETTING RESIN COMPOSITION

CROSS REFERENCE TO RELATED APPLICATION

This is a divisional application of application Ser. No. 09/286,801 filed Apr. 6, 1999 now U.S. Pat. No. 6,300,425.

BACKGROUND OF THE INVENTION

The present invention relates to a thermosetting resin composition. In particular, the present invention relates to a thermosetting resin composition, which is suitably used for protective layers, electric insulation coatings and the like for electric appliances, electronic devices and the like. The present invention also relates to a modified carbodiimide resin, which is suitably used as a component of the aforementioned thermosetting resin composition.

As such a thermosetting resin composition as mentioned above, there have been known, for example, thermosetting resin compositions containing one or more kinds of organic polyisocyanates, one or more kinds of organic monoisocyanates, one or more kinds of crosslinking agents having two or more active hydrogen groups in a molecule thereof, and one or more kinds of catalysts promoting carbodiimidation of the isocyanates such as those described in Japanese Patent Publication No. 5-6564 (1993), and thermosetting resin compositions characterized in that they contain (A) a resin which is composed of a polycarbodiimide containing a repeating unit represented by the general formula —N=C=N—$R^1$— wherein $R^1$ represents a divalent organic group, on which one or more kinds of compounds having a group causing grafting reaction and a carboxylic acid anhydride group are grafted, and (B) an epoxy compound such as those disclosed in Japanese Patent Application Laid-Open No. 8-81545 (1996).

However, an adhesive property and resistance to humidity after curing of such thermosetting resin compositions as those disclosed in Japanese Patent Publication No. 5-6564 (1993) have room for improvement, though they are excellent in heat resistance after curing. Further, such thermosetting resin compositions as those disclosed in Japanese Patent Application Laid-Open No. 8-81545 (1996) requires strict moisture content control because they have acid anhydride groups, and disadvantageously takes a long period of time for the reaction with the epoxy resin.

SUMMARY OF THE INVENTION

The present invention has been accomplished to solve such problems of the prior art, and its object is to provide a thermosetting resin composition, which is excellent in an adhesive property, resistance to humidity, and heat resistance after curing, and requires less labor for the production process control.

The present inventors earnestly conducted investigations to achieve the aforementioned object, and as a result, found that a thermosetting resin composition which is excellent in an adhesive property, resistance to humidity and heat resistance can be obtained by mixing a carbodiimide resin modified with an aromatic diamine, and an epoxy resin, and curing them. Based on this finding, the present invention has been accomplished.

Thus the present invention provides a thermosetting resin composition (also referred to as the thermosetting resin composition of the present invention hereinafter) which comprises:

a modified carbodiimide resin obtainable by reacting a carbodiimide comprising a repeating unit represented by the general formula: —(NCN—$R^1$)- wherein $R^1$ represents a divalent organic group, with an aromatic diamine represented by the general formula: $H_2N$—$R^2$—$NH^2$ wherein $R^2$ represents a divalent organic group having a benzene ring, and an epoxy resin.

In the thermosetting resin composition of the present invention, $R^1$ is preferably an organic group derivable from an aromatic diisocyanate. The aromatic diamine is preferably diaminodiphenyl sulfone or diaminodiphenylmethane.

The epoxy resin is preferably a bisphenol epoxy resin or a novolak epoxy resin.

The present invention also provides the above modified carbodiimide resin usable for the thermosetting resin composition of the present invention.

DETAILED DESCRIPTION OF THE INVENTION

The embodiments of the present invention will be described hereinafter.

(1) Modified Carbodiimide Resin

The modified carbodiimide resin can be obtained by reacting a carbodiimide resin and an aromatic diamine.

The carbodiimide resin is a resin containing a repeating unit represented by the general formula: —(NCN—$R^1$)- wherein $R^1$ represents a divalent organic group.

The carbodiimide resin can be produced by allowing an organic polyisocyanate to react in the presence of a carbodiimidation catalyst that catalyzes carbodiimidation reaction of isocyanate groups according to a known method (see, for example, Japanese Patent Application Laid-Open No. 8-81545(1996)).

Examples of the organic polyisocyanate include aromatic polyisocyanates and aliphatic polyisocyanates. More specifically, there can be mentioned tolylene diisocyanate (in the present specification, it means 2,4-tolylene diisocyanate, 2,6-tolylene diisocyanate, or a mixture thereof, and they are collectively referred to as TDI), 4,4',4"-triphenylmethylene triisocyanate, 4,4'-dimethyldiphenylmethane- 2,2', 5,5'-tetraisocyanate, xylene diisocyanate, hexamethylene-1,6-diisocyanate, lysine diisocyanate methyl ester, polymethylene polyphenyl isocyanate, hydrogenated methylene diphenyl isocyanate, m-phenylene diisocyanate, naphthylene-1, 5-diisocyanate, 1-methoxyphenyl-2, 4-diisocyanate, diphenylmethane-4, 4'-diisocyanate (referred to as MDI), 4,4'-biphenylene diisocyanate, 3, 3'-dimethoxy-4, 4'-biphenyl diisocyanate,3, 3'-dimethyl-4, 4'-biphenyl diisocyanate, 3, 3'-dimethyldiphenylmethane-4, 4'-diisocyanate, isophorone diisocyanate and the like.

Preferred organic polyisocyanates are organic diisocyanates, and preferred organic diisocyanates include, for instance, aromatic diisocyanates. Specific examples thereof are TDI and MDI. These organic polyisocyanates may be used alone or as a mixture of two or more kinds of them.

$R^1$ is specifically a divalent organic group derivable from the aforementioned organic polyisocyanates. $R^1$ may consist of a plurality of kinds of groups, and in such a case, the bonding order of such groups is not particularly limited. Preferably, $R^1$ is an organic group having the following formula, which can be derived from TDI and MDI:

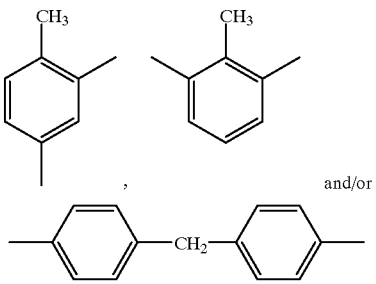

, and/or

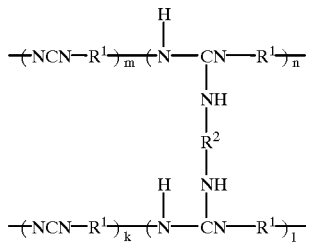

The average molecular weight of the carbodiimide resin used for the present invention is generally in the range of 200 to 50000, preferably in the range of 500 to 20000.

The carbodiimide resin may be one synthesized by simultaneously using organic polyisocyanates and organic monoisocyanates in order to, for example, control the molecular weight. As such organic monoisocyanates, there can be mentioned phenyl isocyanate, o-, m- or p-tolyl isocyanate, dimethylphenyl isocyanate, cyclohexyl isocyanate, methyl isocyanate, chlorophenyl isocyanate, trifluoromethylphenyl isocyanate, naphthyl isocyanate and the like. As for the amount of the organic monoisocyanate to be used, while it may be selected depending on the desired physical properties, it is usually used in a stoichiometric ratio with respect to the organic polyisocyanate, i.e., a ratio to isocyanate groups of the organic polyisocyanate, of 0.01 to 0.3, preferably 0.02 to 0.2.

The aromatic diamine is represented by the general formula $H^2N-R^2-NH_2$ wherein $R^2$ is a divalent organic group having a benzene ring.

Examples of the aromatic diamine include diaminodiphenyl sulfone, diaminodiphenylmethane, diaminodiphenyl ether and the like. Preferred aromatic diamines are diaminodiphenyl sulfone, and diaminodiphenylmethane.

The reaction of the carbodiimide resin and the aromatic diamine may be performed by, for example, dissolving the carbodiimide resin in a solvent, adding the aromatic diamine to the solution, and mixing and heating the solution. As the solvent, any organic solvents dissolving the carbodiimide resin such as toluene, cyclohexanone, and tetrahydrofuran can be used. The reaction rate may be suitably controlled within a range up to the reflux temperature of the solvent used.

The reaction may also be performed by adding the aromatic diamine to a reaction mixture in which the carbodiimide resin has been synthesized without separating the formed carbodiimide resin from the reaction mixture.

As for the ratio of the carbodiimide resin to the aromatic diamine, usually 0.01 to 1 mol, preferably 0.02 to 0.5 mol of the diamine is used for 1 equivalence of carbodiimide group.

Because the modified carbodiimide resin is usually deposited as powder, the formed modified carbodiimide resin can be collected by filtration from the reaction mixture after the reaction, and dried to give the modified carbodiimide resin.

The modified carbodiimide resin obtained as described above is considered to have a partially guanidylated structure (guanidine group) represented by the following formula:

$$-(-NCN-R^1-)_m-(-N-CN-R^1-)_n-$$
$$\qquad\qquad\qquad\quad |$$
$$\qquad\qquad\qquad\quad NH$$
$$\qquad\qquad\qquad\quad |$$
$$\qquad\qquad\qquad\quad R^2$$
$$\qquad\qquad\qquad\quad |$$
$$\qquad\qquad\qquad\quad NH$$
$$-(-NCN-R^1-)_k-(-N-CN-R^1-)_l-$$

Carbodiimide group   Guanidine group

In the formula, $R^1$ and $R^2$ have the same meanings as defined above, and m, n, k and l are each an integer.

As seen from the aforementioned structure, the modified carbodiimide resin used for the present invention does not have any unstable groups such as acid anhydride groups, and therefore the production process control for the thermosetting resin containing it is easy. Accordingly, the present invention also provides the modified carbodiimide resin mentioned above which is suitably usable for the thermosetting resin composition.

(2) Epoxy Resin

The epoxy resin is not particularly limited so long as the modified carbodiimide resin functions as its curing agent.

Examples of the epoxy resin include glycidyl ether epoxy resins (bisphenol epoxy resins, novolak epoxy resins, cresol novolak epoxy resins and the like), glycidyl ester epoxy resins, glycidylamine epoxy resins, alicyclic epoxy resins, heterocyclic epoxy resins, liquid rubber-modified epoxy resins and the like. Preferred epoxy resins are bisphenol epoxy resins and novolak epoxy resins. These epoxy resins are used alone or as a mixture of two or more kinds of them.

(3) Thermosetting Resin Composition

The thermosetting resin composition of the present invention can be obtained by mixing the modified carbodiimide resin and the epoxy resin explained above.

While the mixing ratio of the modified carbodiimide resin and the epoxy resin may be suitably selected depending on the kind of the resins, purpose of the composition and the like, usually 1 to 400 parts by weight, preferably 5 to 200 parts by weight of the epoxy resin is used for 100 parts by weight of the modified carbodiimide resin.

The means for mixing is not particularly limited, but fusion kneading by a kneader or a hot mill, mixing in a suitable solvent inert to the modified carbodiimide resin and the epoxy resin and the like can be exemplified.

The thermosetting resin composition of the present invention may contain various additives, which have been used for conventional thermosetting resin compositions. As such additives, fiber reinforcing materials, powder or crystalline fillers (e.g., fused silica), pigments, curing catalysts promoting curing by the reaction of the modified carbodiimide resin and the epoxy resin, and the like can be mentioned. Such various additives may either be simultaneously added upon the mixing mentioned above, or added after the aforementioned mixing. They may also be added to any one of the resins mentioned above before the mixing.

The thermosetting resin composition of the present invention may be used in a ground state, if necessary. The various additives may be combined after the grinding.

The thermosetting resin composition of the present invention can be converted to a final cured product by heating to a temperature in the range of, usually 80 to 200° C., preferably 120 to 200° C. A cured product in a desired shape can be obtained by performing the heating in a suitable mold under pressure.

This curing is considered to be caused by crosslinking obtained by the reaction between the guanidine groups present in the modified carbodiimide resin and the epoxy groups, and the reaction between the carbodiimide groups and the epoxy groups.

Modified carbodiimide resin + Epoxy resin

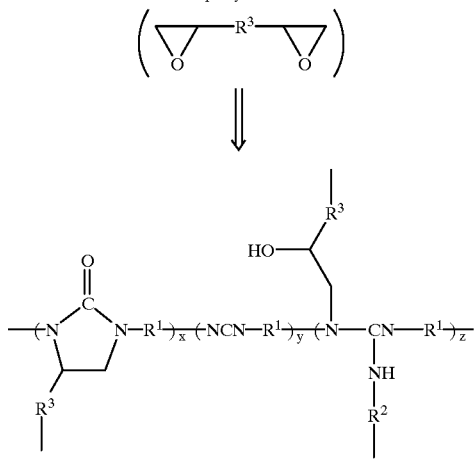

In the formula, $R^1$ and $R^2$ have the same meanings as defined above, $R^3$ is a divalent organic group, and x, y and z are each an integer.

According to the present invention, there are provided a thermosetting resin composition, which is excellent in an adhesive property, resistance to humidity, and heat resistance after curing, and a modified carbodiimide resin suitably used for the composition. Further, because the thermosetting resin composition of the present invention does not contain unstable reactive groups such as acid anhydride groups, it requires less labor for the production process control.

EXAMPLES

The present invention will further be described with reference to the following examples hereinafter.

Synthesis Example 1

MDI (60.0 g), phenyl isocyanate (PhNCO, 4.76 g), and toluene (250.0 g) were introduced into a 500-ml separable flask, and 1-phenyl- 3-methyl-3-phospholene-1-oxide (86.3 mg) as a carbodiimidation catalyst was added thereto. The mixture was allowed to react under reflux for five hours to give Carbodiimide resin solution ①.

To 200 g of the above Carbodiimide resin solution ①, diaminodiphenyl sulfone (DDS, 4.25 g) was added. After they were allowed to react for five hours under reflux, pale white powder was produced. The powder was taken by filtration and dried to give Modified carbodiimide resin powder ① (37.4 g). In the IR analysis of this powder, absorption at 2150–2100 cm$^{-1}$ of carbodiimide group, and absorption at 1640 cm$^{-1}$ of guanidine group were confirmed.

Further, modified carbodiimide resin powder ② (35.9 g) was obtained in the same manner as the synthesis of the above Modified carbodiimide resin powder ①, except that 2.07 g of DDS was added to 200 g of the above Carbodiimide resin solution ①. In the IR analysis of this powder, absorption at 2150–2100 cm$^{-1}$ of carbodiimide group, and absorption at 1640 cm$^{-1}$ of guanidine group were confirmed.

Synthesis Example 2

TDI (2,4-compound:2,6-compound=80:20, 34.9 g), PhNCO (4.78 g), and cyclohexanone (270.0 g) were introduced into a 500-ml separable flask, and 1-phenyl-3-methyl-3-phospholene-1-oxide (71.1 mg) as a carbodiimidation catalyst was added thereto. The mixture was allowed to react at 120° C. for six hours to give Carbodiimide resin solution ②.

To 200 g of the above Carbodiimide resin solution ②, DDS (1.79 g) was added. After they were allowed to react at 120° C. for six hours, yellow powder was produced. The powder was taken by filtration and dried to give modified carbodiimide resin powder ③ (19.7 g). In the IR analysis of this powder, absorption at 2140 cm$^{-1}$ of carbodiimide group, and absorption at 1650 cm$^{-1}$ of guanidine group were confirmed.

Reference Example

Carbodiimide resin solution ① provided in Synthesis Example 1 was cooled to 10° C. to deposit a resin, and was filtered to give Carbodiimide resin powder ④ with a yield of 95%.

Carbodiimide resin solution ② provided in Synthesis Example 2 was cooled to 10° C., and mixed with acetone as a poor solvent to deposit a resin. However, it was obtained as a mass, and could not be obtained as powder.

Examples 1 to 4 and Comparative Examples 1 and 2

By using Carbodiimide resin powders ① to ④ obtained in Synthesis Examples 1 and 2 and Reference Example, the materials, i.e., epoxy resin, carbodiimide resin powder and fused silica, were mixed in the ratios represented in Table 1, and subjected to fusion kneading in a hot mill. Subsequently, the mixtures were cooled and ground to obtain powdered resin compositions.

By using the obtained powdered resin compositions, silicon chips were sealed by the transfer molding method to prepare flat package type sealed semiconductor devices as test pieces. These test pieces were evaluated for solder heat resistance and resistance to humidity by the following methods. The results are also shown in Table 1.

Evaluation

1. Solder Heat Resistance

Test pieces were placed under the conditions of 85° C. and 85% Rh for 72 hours, and then dipped in a solder bath at 250° C. for 10 seconds. This procedure was repeated twice. The results are represented as numbers of the test pieces generating cracks per 12 test pieces.

2. Resistance to Humidity

Test pieces were placed in saturated steam under the conditions of 121° C. and 2 atm for 100 hours, and leak current value of the test pieces (semiconductor package devices) was measured. Any test pieces that exhibited a value higher by 5 times or more than that obtained before the test were considered defective, and the results are represents as the numbers of defective test pieces per 12 test pieces.

TABLE 1

Composition and evaluation results

| | Example | | | | Comparative Example | |
|---|---|---|---|---|---|---|
| | 1 | 2 | 3 | 4 | 1 | 2 |
| Composition | | | | | | |
| Epoxy resin | | | | | | |
| Bisphenol A type | 15 | 13 | 14 | | 14 | |
| Novolak type | | | | 13 | | 13 |
| Carbodiimide resin powder | | | | | | |
| ① | 10 | | | | 12 | |
| ② | | 12 | | | | |
| ③ | | | 10 | | | |
| ④ | | | | 10 | | 12 |
| Fused Silica | 75 | 75 | 75 | 75 | 75 | 75 |
| Evaluation | | | | | | |
| Solder heat resistance | 0/12 | 0/12 | 1/12 | 0/12 | 9/12 | 6/12 |
| Resistance to humidity | 0/12 | 1/12 | 0/12 | 0/12 | 10/12 | 9/12 |

Bisphenol A epoxy resin (epoxy equivalent: 190 g/eq)
Novolak epoxy resin (epoxy equivalent: 180 g/eq)

As clearly seen from the results shown in Table 1, when the modified carbodiimide resins of the present invention were used, excellent solder heat resistance and resistance to humidity could be obtained. Further, since solder heat resistance and resistance to humidity are characteristics influenced by an adhesive property, it was also confirmed that they were excellent in the adhesive property.

What is claimed is:

1. A guanidine-modified carbodiimide resin obtained by dissolving a carbodiimide resin consisting essentially of a repeating unit represented by the general formula: —(NCN—$R^1$)- wherein $R^1$ represents a divalent organic group, in a solvent to obtain a solution, and adding an aromatic diamine represented by the general formula: $H_2N$—$R^2$—$NH_2$ wherein $R^2$ represents a divalent organic group having a benzene ring, to the solution, thereby reacting the carbodiimide resin with the aromatic diamine in the solution.

2. The guanidine-modified carbodiimide resin according to claim 1, wherein $R^1$ is a group derived from an aromatic diisocyanate.

3. The guanidine-modified carbodiimide resin according to claim 1, wherein the aromatic diamine is diaminodiphenyl sulfone or diaminodiphenylmethane.

4. The guanidine-modified carbodiimide resin according to claim 2, wherein the aromatic diamine is diaminodiphenyl sulfone or diaminodiphenylmethane.

5. The guanidine-modified carbodiimide resin according to claim 1, wherein $R^1$ is a group derived from a polyisocyanate selected from the group consisting of tolylene diisocyanate, 4,4',4"-triphenylmethylene triisocyanate, 4,4'-dimethyldiphenylmethane-2,2',5,5'-tetraisocyanate, xylene diisocyanate, hexamethylene-1,6-diisocyanate, lysine diisocyanate methyl ester, polymethylene polyphenyl isocyanate, hydrogenated methylene diphenyl isocyanate, m-phenylene diisocyanate, napthylene-1,5-diisocyanate, 1-methoxyphenyl-2,4-diisocyanate, diphenylmethane-4,4'-diisocyanate, 4, 4'-diphenylene diisocyanate, 3,3'-dimethyl-4,4'-biphenyl diisocyanate, 3,3'-dipmethyldiphenyl-methane-4,4'-diisocyanate and isophorone diisocyanate.

6. The guanidine-modified carbodiimide resin according to claim 2, wherein $R^1$ is a group selected from the group consisting of:

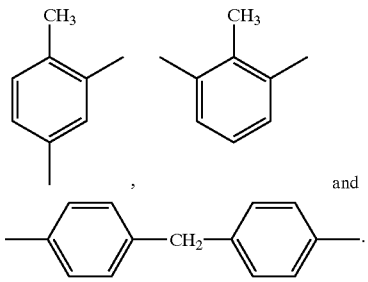

* * * * *